May 11, 1954     G. L. MacNEILL     2,678,062
FLUID REVERSING DEVICE
Filed March 3, 1952
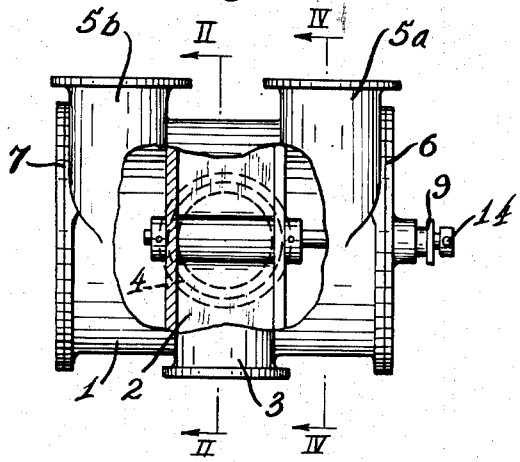
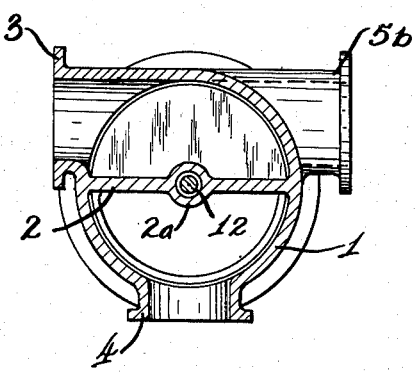
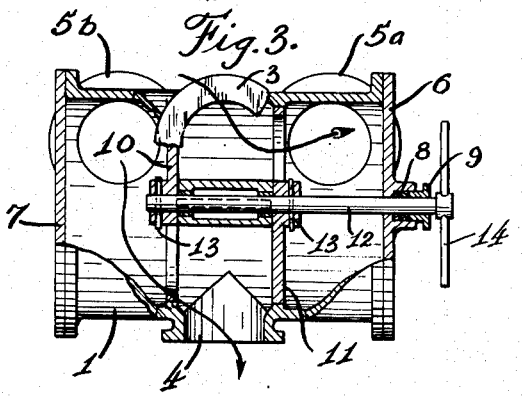
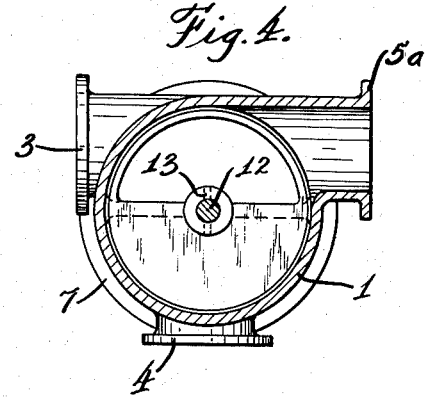
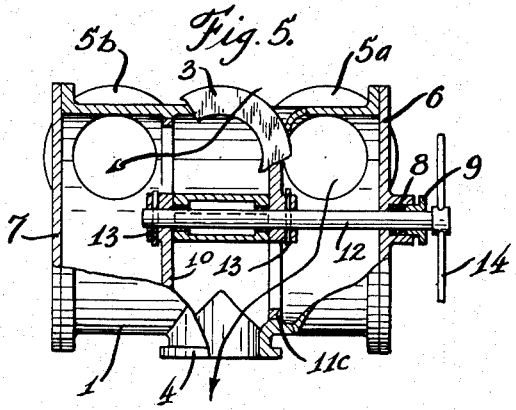
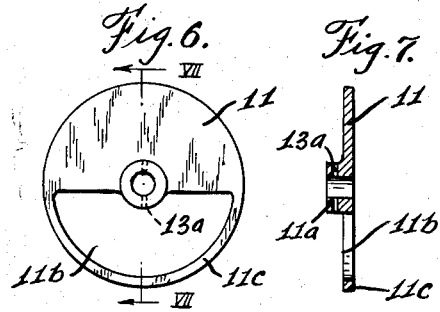
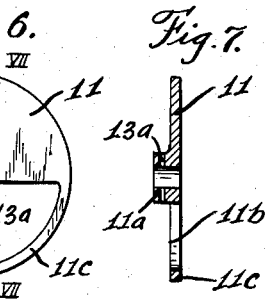
INVENTOR.
GEORGE L. MacNEILL
BY
*William J. Ruano*
ATTORNEY Patented May 11, 1954

2,678,062

UNITED STATES PATENT OFFICE 2,678,062

FLUID REVERSING DEVICE

George L. MacNeill, Reading, Pa.

Application March 3, 1952, Serial No. 274,619

5 Claims. (Cl. 137—595)

This invention relates to a fluid reversing device and, more particularly, to a reversing valve for reversing the direction of flow of fluid through other apparatus, such as heat exchangers, surface condensers and similar apparatus for the purpose of dislodging debris from the tubes and tube sheets thereof or for other purposes. However, the present invention is not restricted to such use and may be used for selectively directing a flow of fluid to either side of the piston in a reciprocating engine type of apparatus, or for any other application wherein it is desired to reverse the flow of fluid.

Fluid reversing devices or valves of conventional construction which are employed for reversing the flow of fluid through heat exchangers, surface condensers and similar apparatus for dislodging debris from the tubes thereof and for other purposes, have various disadvantages, one of these being that the rotors of such devices are generally cumbersome and heavy in construction, therefore requiring the exertion of considerable force or power for operating the valve. Also, they are expensive to manufacture. Moreover, these valves are of such construction as to provide hydraulic unbalance of liquid flow therethrough, thus enhancing the difficulty of rotating the rotor to operate the valve. Additionally, such commonly used fluid reversing devices are of a design which restricts the choice of nozzle or port locations, therefore requiring an uneconomical arrangement of piping between the device and the apparatus served by it, particularly in the case of a large surface condenser which requires large and expensive piping connections.

An object of this invention is to provide a novel fluid reversing device which is devoid of the above named disadvantages of conventionally used fluid reversing devices, particularly those of large construction for hydraulic systems.

A more specific object of the present invention is to provide a fluid reversing device which is particularly useful for reversing the direction of flow of liquid through heat exchangers, surface condensers, and other large apparatus for the purpose of dislodging debris from the tubes thereof and for other purposes, which device comprises a rotor of relatively simple and light construction, therefore which requires very little force to rotate it, and which is exceedingly economical to manufacture.

A further object of this invention is to provide a novel, hydraulic fluid reversing device which is of symmetrical construction and which eliminates hydraulic unbalance, therefore facilitating operation of the device, also which enables a wide variety of choice of nozzle and piping locations, thus enabling an economical or optimum arrangement of piping between the device and the apparatus served by it, such as, for example, a large surface condenser.

Other objects and advantages of the present invention will become apparent from a study of the following description taken with the accompanying drawing wherein:

Figure 1 is a plan view, with a top portion broken away, of a fluid reversing device embodying the principles of my invention;

Figure 2 is a cross-sectional view taken along line II—II of Figure 1;

Figure 3 is an elevational view, with a top portion shown broken away, of the device shown in Figure 1;

Figure 4 is a cross-sectional view taken along line IV—IV of Figure 1;

Figure 5 is an elevational view similar to Figure 3, except that it shows the semi-circular partitions or guide plates 10 and 11 rotated through an angle of 180° with respect to the positions shown in Figure 2 for reversing the flow of fluid through the controlled device;

Figure 6 is a plan view of one of the guide plates or partitions 11, and

Figure 7 is a cross-sectional view taken along line VII—VII of Figure 6.

Referring more particularly to the figures in the drawing, numeral 1 denotes a substantially cylindrical casing having rigidly secured therein a fixed transverse partition 2, preferably extending diametrically of the casing and extending longitudinally of the casing through an intermediate portion of the length thereof. The casing is provided with an inlet port 3 located circumferentially of the casing on one side of the partition 2 and is also provided with an outlet port 4 located circumferentially of the casing on the other side of partition 2. It should be understood, of course, that the inlet and outlet ports 3 and 4, respectively, may be reversed, if so desired, so as to employ port 4 as the inlet, and port 3 as the outlet.

The casing is also provided with a pair of end ports 5a and 5b, that is, ports located on the end portions of the casing beyond the longitudinal extremities of partition 2. Such ports 5a and 5b may be connected to a heat exchanger, surface condenser or similar apparatus (not shown) for the purpose of dislodging debris from the tubes and tube sheets thereof, or they could be connected to other apparatus for the purpose of reversing the flow of fluid therethrough. The ends of casing 1 are closed by casing cover plates 6 and 7.

Partition 2 is provided with a central, hub-like portion 2a which surrounds a shaft 12 which extends axially into the casing 1. The fixed hub-like portion 2a thus serves as a bearing member for shaft 12.

A pair of guide plates or partitions 10 and 11 are rigidly secured to shaft 12 in longitudinally spaced relationship and are fastened to shaft 12 by means of locking pins 13 or other suitable fastening means. Guide plates 10 and 11 are positioned adjacent the longitudinal extremities of partition 2. These plates are arranged to provide light rubbing contact with the ends of the partitions and are arranged to be revolved freely within the casing as the result of rotation of shaft 12.

Plates 10 and 11 are preferably of the construction shown in Figures 6 and 7, which illustrates plate 11. Plates 10 and 11 are in the form of discs, each having a hub-like extension, such as 11a, and a radially extending hole 13a for accommodating a locking pin 13. Plates 10 and 11 are also provided with cut-away portions, such as 11b, of substantially semicircular configuration, but of smaller radius than the plate so as to leave a rim portion 11c which extends about the entire perimeter of the plate and which is adapted to closely fit within a circumferential inner wall portion of casing 1. Plates 10 and 11 are so mounted on shaft 12 that the solid portions or segments thereof extend radially in opposite directions, as shown in Figure 3.

A stuffing box 8 of any well known construction is provided centrally of the casing cover plate 6 to form a fluid seal at the place of entry of shaft 12. At the end of shaft 12 there is rigidly secured a manually operable element such as a handle (or wheel) 14 which is employed for the purpose of rotating the shaft 12 and for properly positioning guide plates 10 and 11. Of course, in exceedingly large structures, or in structures wherein rotation of shaft 12 is to be effected by power operated means rather than by manual operation, it will be apparent that suitable gearing may be provided in place of handle 14 which may be operated by a motor or other means of motive power (not shown).

The operation of the device is as follows: assume that fluid is supplied through inlet port 3. With plates 10 and 11 in the position shown in Figure 3, fluid will flow from inlet port 3, along one side of partition 2 and will be discharged from the casing through port 5a as shown by the arrow in Figure 3. The only other path for fluid is from port 5b to outlet port 4, along the other side of partition 2. That is to say, the semicircular solid portion of plate 10 will close off possible fluid flow from inlet port 3 to port 5b. Likewise, the solid semicircular portion of plate 11 will close communication between outlet port 4 and port 5a. Thus the direction of flow will be from port 5a, through the heat exchanger or other apparatus served (not shown), thence into port 5b. However, when it is desired to reverse the direction of flow through such heat exchanger or other apparatus controlled by the fluid reversing device, handle 14 is rotated 180° so that plates 10 and 11 will be correspondingly moved to the positions shown in Figure 5. Now the direction of flow will be from inlet port 3 and along one side of partition 2 to port 5b, thence to the heat exchanger or other apparatus controlled (not shown) to port 5a, thence along the opposite side of partition 2 to outlet port 4. Therefore, it will be seen that the direction of fluid flow through ports 5a and 5b is reversed by mere rotation of shaft 12 through an angle of 180°, which, of course, reverses the fluid flow through the apparatus to which ports 5a and 5b are connected, such as the heat exchanger, etc.

It will be apparent that the inlet and outlet ports 3 and 4 may be reversed and still a reversal of flow through ports 5a and 5b may be effected by rotating plates 10 and 11 through an angle of 180°. It will also be apparent that inlet and outlet ports 3 and 4, respectively, may be selectively arranged in any position along an arc of almost 180° so long as they are on opposite sides of partition 2. Also, ports 5a and 5b may be disposed anywhere along the periphery of the end portions of casing 1 or on cover plates 6 and 7 so long as they are located beyond plates 10 and 11. Therefore, a wide choice of arrangement of ports is obtained which enables securing of the most economical arrangement of piping between the reversing device and the apparatus served or controlled by it.

Thus it will be seen that I have provided an efficient fluid reversing device of relatively simple construction and including a rotor having relatively light and simple parts which are inexpensive to manufacture and which enable rotation thereof with a minimum effort for effecting reversal of fluid flow through apparatus served by the fluid reversing device, such as a heat exchanger, surface condenser, reciprocating engine or, in fact, any device through which fluid flow is to be made reversible; furthermore, by virtue of the symmetrical arrangement of parts and of the construction of my fluid reversing device, hydraulic unbalance is eliminated when the device is used in a hydraulic system, such as for the purpose of dislodging debris from the tubes and tube sheets of surface condensers and the like, therefore greatly facilitating operation of the device with minimum expenditure of effort; also, I have provided a novel construction of fluid reversing device which enables the use of a wide variety of nozzle or port locations, thereby offering considerable flexibility in design from the standpoint of the most economical and desirable piping arrangement for a given application, such as in the case of serving a large surface condenser wherein such choice in piping arrangements enables substantial savings in piping costs.

While I have illustrated and described a certain specific embodiment of my invention, it will be understood that this is by way of illustration only, and that various changes and modifications may be made within the contemplation of my invention and within the scope of the following claims.

I claim:

1. A fluid reversing device, comprising a substantially cylindrical casing, a stationary partition within said casing extending substantially diametrically and longitudinally along an intermediate portion of the length of the casing, said casing having inlet and outlet ports located on opposite sides of said partition on said intermediate portion and having a pair of end ports located on opposite end portions of the casing, each of said end ports located on a portion of the casing beyond the end of said partition, a shaft extending axially into said casing, a pair of longitudinally spaced, radially extending, partition forming segments rigidly fastened to said shaft for rotation therewith and extending in opposite directions, in contiguous relationship with opposite ends of said partition and closely fitting an inner wall portion of said casing, whereby upon rotation of said shaft and segments through an angle of 180°, fluid entering said inlet port and flowing longitudinally along one side of said longitudinally extending partition may be selectively discharged through either of said end ports, and, simultaneously, fluid entering the other of said end ports may be discharged through said outlet port.

2. A fluid reversing device, comprising a substantially cylindrical casing, a stationary partition within said casing, extending diametrically of and longitudinally along only an intermediate portion of the length of said casing, said casing having inlet and outlet ports located on opposite sides of said partition on said intermediate portion and having a pair of end ports, each end port located on an end portion of the casing beyond the end of said partition, a shaft extending axially into said casing, a pair of longitudinally spaced, substantially semi-circular partitions rigidly secured to said shaft and extending radially in opposite directions immediately adjacent opposite ends of said partition and being disposed so that upon rotation of said shaft and semi-circular partitions through an angle of 180°, a passageway for fluid entering said inlet port and flowing longitudinally along one side of said longitudinally extending partition may be selectively made through either of said end ports, and simultaneously a second passageway may be made for fluid entering the other of said end ports to discharge through said outlet port.

3. A fluid reversing device as recited in claim 2 wherein each of said pair of substantially semi-circular partitions is in the form of a disc having a substantially semi-circular cutaway portion having a radius of less than that of the disc and leaving a rim portion extending circularly and adapted to closely fit an inner wall portion of said casing.

4. Apparatus recited in claim 2 wherein said end ports and semi-circular partitions are symetrically disposed with respect to the radial central plane of said casing, and wherein operating means are provided on said shaft, exteriorly of the casing, for rotating said shaft and semi-circular partitions and for giving a visual indication of the position of said semi-circular partitions.

5. A substantally cylindrical casing, a stationary partition within said casing extending substantially diametrically and longitudinally along only an intermediate portion thereof, said casing having a pair of ports located one on each side of the partition and spaced longitudinally of the casing between the ends of the said partition, a pair of ports located one on each end portion of the casing beyond the end of the said partition, a shaft extending axially into said casing, a pair of longitudinally spaced, radially extending, partition forming segments rigidly fastened to said shaft for rotation therewith and extending in opposite directions in contiguous relationship with opposite ends of said partition, whereby upon rotation of said shaft and segments through an angle of 180 degrees, fluid entering one of the second named pair of ports may be selectively discharged through either of the first named pair of ports, and, simultaneously, fluid entering the other of the first named pair of ports may be discharged through the other of the second named pair of ports.

References Cited in the file of this patent

UNITED STATES PATENTS

| Number | Name | Date |
| --- | --- | --- |
| 707,572 | Fischer | Aug. 26, 1902 |
| 778,332 | Redman | Dec. 27, 1904 |
| 1,519,205 | Kiefer | Dec. 16, 1924 |
| 2,079,743 | Krieger | May 11, 1937 |
| 2,182,724 | Hennessy | Dec. 5, 1939 |
| 2,215,728 | Ruegg | Sept. 24, 1940 |